United States Patent [19]

Brauer et al.

[11] Patent Number: 4,877,455
[45] Date of Patent: Oct. 31, 1989

[54] COATINGS UTILIZING GRAFT POLYOLS

[75] Inventors: Melvin Brauer, East Brunswick; Dominic Simone, Lincroft, both of N.J.

[73] Assignee: CassChem, Inc., Bayonne, N.J.

[21] Appl. No.: 8,720

[22] Filed: Jan. 30, 1987

Related U.S. Application Data

[63] Continuation-in-part of Ser. No. 680,705, Dec. 12, 1984, Pat. No. 4,640,801, which is a continuation-in-part of Ser. No. 581,816, Feb. 21, 1984, abandoned.

[51] Int. Cl.$^4$ ............................................. C08F 242/00
[52] U.S. Cl. .................................... 106/244; 106/243; 106/264; 106/267; 526/281; 526/283; 526/308; 528/74.5; 528/75; 528/245.5; 528/246; 528/295.5; 528/298
[58] Field of Search ............... 528/74, 74.5, 75, 245.5, 528/246, 295.5, 298; 526/308, 283, 281; 106/243, 244, 264

[56] References Cited

U.S. PATENT DOCUMENTS

| | | | |
|---|---|---|---|
| 1,982,707 | 12/1934 | Thomas | 260/2 |
| 2,192,152 | 2/1940 | Rheineck et al. | 260/407 |
| 2,387,895 | 10/1945 | Gerhart | 260/23 |
| 2,390,530 | 12/1945 | Gerhart et al. | 260/23 |
| 2,392,140 | 1/1946 | Gerhart | 260/23 |
| 2,397,600 | 4/1946 | Gerhart | 260/23 |
| 2,398,889 | 4/1946 | Gerhart | 260/23 |
| 2,443,044 | 6/1948 | Lycan et al. | 260/407 |
| 2,601,273 | 6/1952 | Gerhart | 260/235 |
| 2,667,463 | 1/1954 | Jakob | 526/308 |
| 2,689,231 | 9/1954 | McKenna | 526/308 |
| 2,792,410 | 5/1957 | Mundy et al. | 260/407 |
| 2,822,371 | 2/1958 | Nichols | 260/406 |
| 2,837,546 | 6/1958 | Nichols | 260/407 |
| 2,861,050 | 11/1958 | Christenson | 526/308 |
| 3,031,422 | 4/1962 | Posnansky | 528/74.5 |
| 3,496,129 | 2/1970 | Wismer | 526/308 |
| 4,064,199 | 12/1977 | Nishiwaka | 260/879 |
| 4,256,619 | 3/1981 | Miyazuchi et al. | 260/23.7 |
| 4,311,624 | 1/1982 | Emmons et al. | 260/22 CB |
| 4,330,448 | 5/1982 | Iwata | 526/79 |
| 4,339,367 | 7/1982 | Chino et al. | 525/131 |
| 4,546,120 | 10/1985 | Peerman | 528/74.5 |
| 4,556,701 | 12/1985 | Schindler et al. | 526/282 |
| 4,640,801 | 2/1987 | Simone | 528/74.5 |
| 4,678,710 | 7/1987 | Sakimoto | 526/308 |

FOREIGN PATENT DOCUMENTS

| | | |
|---|---|---|
| 45136 | 2/1982 | European Pat. Off. . |
| 157596 | 10/1985 | European Pat. Off. . |

OTHER PUBLICATIONS

*Derwent* Search Report (File WPIL) Showing Abstract and Patent Family Data For Japanese Patent J60228518 published 13 Nov. 1985.
*JAPIO* Search Report For J60228518.
"Properties and Uses of Dicyclopentadiene and Methylcyclopentadiene Dimer", by Exxon Chemicals.
Encyclopedia of Polymer Science and Technology, vol. 5 (1966), pp. 126–139, "Driers and Metallic Soaps".

*Primary Examiner*—C. Warren Ivy
*Attorney, Agent, or Firm*—Pennie & Edmonds

[57] ABSTRACT

Liquid, low viscosity, graft polyols comprising the liquid reaction product of a vegetable oil or unsaturated fatty carbon compound having at least eight carbon atoms, at least one hydroxyl group, and at least one double bond, said compound having other than terminal unsaturation a cyclopentadienyl compound and a terminally unsaturated monomer having at least one hydroxyl group, when cured with a polyisocyanate, melamine, or formaldehyde compound, or when esterified with a polybasic acid composition to form an alkyd resin, yield high solids or solventless polyurethane compositions useful as coatings, adhesives, potting or molding compounds.

58 Claims, No Drawings

COATINGS UTILIZING GRAFT POLYOLS

CROSS-REFERENCE TO RELATED APPLICATIONS

This application is a continuation-in-part of Ser. No. 680,705, filed Dec. 12, 1984, now U.S. Pat. No. 4,640,801, issued on Feb. 3, 1987, which is a continuation-in-part of Ser. No. 581,816, filed Feb. 21, 1984, abandoned.

TECHNICAL FIELD

This invention relates to a novel class of graft polyols which are liquids of relatively low viscosity at ambient temperature. These polyols, when cured with polyisocyanates, melamine or formaldehyde compounds, or when used in the preparation of alkyd resins, yield solventless or high solids compositions which are useful as coatings, adhesives and potting or molding compounds.

BACKGROUND ART

Polyols are very well known to those skilled in the art due to their utility as reactants for the preparation of a variety of polymeric or resin compositions. Typical reactions include curing or crosslinking reactions with isocyanate or polyisocyanate materials having at least two isocyanate groups per mole, melamines or formaldehyde compounds.

One class of polyols includes polyester polyols or the hydroxy terminated polyesters. These are generally prepared by an esterification reaction of a diol or mixtures of diols and triols with a dicarboxylic acid or anhydride. Examples of such suitable diols and triols are ethylene glycol, propylene glycol, 1,3 propane diol, 1,4 butane diol, neopentyl glycol, trimethylol propane and the like. Examples of such dicarboxylic acids and anhydrides are phthalic acid, phthalic anhydride, isophthalic acid, maleic acid, maleic anhydride, succinic acid, adipic acid and the like. These polyester polyols, however, are generally high viscosity compounds which, when mixed with a curing or crosslinking agent, have to be diluted or dissolved in relatively large amounts of a suitable solvent in order to provide low viscosity, easy to apply coating compositions.

Because a large amount of solvent is required to reduce the viscosity of these polyols, they are not suitable for the formulation of high solids coatings. Moreover, due to the presence of the solvent, these polyols cannot be used in compounds for potting or molding applications.

A second class of polyols is the acrylic polyols. These are prepared by the copolymerization of a hydroxy acrylate or methacrylate with acrylate and/or methacrylate esters or styrene. Examples of suitable monomers are hydroxyethyl acrylate, hydroxyethyl methacrylate, hydroxypropyl acrylate, hydroxypropyl methacrylate, methyl acrylates, ethyl acrylate, butyl acrylates, 2-ethylhexyl acrylate, methyl methacrylate, butyl methacrylate and the like.

These hydroxy-containing acrylic polymers, like the polyester polyols, are high viscosity compounds which, when mixed with the desired curing or crosslinking agent, also require large amounts of solvent to provide low viscosity, easy to apply coating compositions. Again, due to the presence of a large amount of solvent, these polyols are not suitable for the high solids coatings, or for potting and molding applications.

A third class of polyols comprises polyether polyols. These are prepared by the homopolymerization and copolymerization of ethylene oxide and propylene oxide. Although some of the polyols in this class have acceptable viscosity, particularly those with low molecular weights, they are not suitable for high solids coating applications because of their relatively poor physical properties. Specifically, these deficient properties include poor light stability, poor weathering properties, and poor solvent and water resistance.

Cyclopentadiene has been copolymerized with drying and semidrying oils by a process described in U.S. Pat. No. 2,390,530 to Gerhart for the purpose of providing inexpensive, solid resin compositions which are suitable as "gums" or resins for ultimate use in paints and varnishes. These oils include linseed oil, soybean oil, perilla oil, oiticica oil, tung oil, cotton oil, palm oil, and sunflower oil. U.S. Pat. No. 2,392,140, also to Gerhart, describes a process for the polymerization of cyclopentadiene either alone or conjointly with an equimolar ratio of a glyceride oil or an ethylenic compound such as indene, coumarone, methyl methacrylate, styrene, or maleic anhydride. The resulting resins, at least while hot, are liquid and can be admixed with additional drying oils, thinners, and the like to obtain a resin paint or varnish of desired viscosity and color.

While the above-described resins are useful for certain paint and varnish compositions, they do not contain any hydroxyl groups which can be reacted with a curing or crosslinking agent such as a polyisocyanates, melamines, or formaldehyde compounds to form high solids resin coatings.

One family of resin compositions which contains the requisite hydroxyl groups is the alkyd resins. These alkyd resins are produced as products of an esterification reaction involving a polyhydric alcohol, i.e., a polyol such as glycerol, sorbital, ethylene glycol or pentaerythritol, and a polybasic acid.

The resultant polyester resins, of which the alkyds are one type, may then be modified with monobasic fatty acids, most of which are derived from natural drying and nondrying oils, such as linseed oil, soybean oil and castor oil, to form resin compositions having acceptable properties for certain applications.

Castor oil is a triglyceride ester of ricinoleic acid and contains approximately 3 hydroxyl groups per molecule. It is, therefore, a polyester polyol which can be reacted with isocyanates, polyisocyanate, melamine, formaldehyde or polybasic acid compounds. These castor oil compositions, however, have relatively poor mechanical properties and solvent resistance.

DISCLOSURE OF INVENTION

An object of the present invention is to provide novel graft polyols which are liquid and of low viscosity at ambient temperature so that, when mixed with isocyanate, polyisocyanate, aminoplast resins such as melamine-formaldehyde, or polybasic acid components, they yield high solids coating compositions and adhesives.

Another objective is to provide polyols which, when mixed with isocyanates, polyisocyanates, aminoplast resins such as melamine-formaldehyde, or polybasic acid compounds, yield coating compositions which have outstanding physical properties, solvent resistance, and weathering properties.

The novel graft polyols of the present invention comprise a three-component liquid reaction product: at least one vegetable oil or fatty alcohol having at least 8 carbon atoms, at least one liquid cyclopentadienyl compound; and at least one terminally unsaturated monomer or compound having at least one hydroxyl group. Generally a copolymer of the cyclopentadienyl compound and terminally unsaturated hydroxyl monomer is grafted to the vegetable oil or fatty alcohol by the methods described hereinbelow.

The vegetable oils useful in this invention include chinawood oil, soybean oil, dehydrated castor oil, sunflower oil, cotton oil, safflower oil, perilla oil and others containing substantial quantities of synthetic or natural unsaturated glycerides of drying oil acids or the corresponding esters of sorbitol, pentaerythritol, or other similar polyhydric alcohol polyesters of drying oil acids. Also, mixtures of such oils may be used.

Similarly, synthetic triglycerides, i.e., those obtained from the ring opening of partially epoxidized vegetable oils, are suitable. These synthetic materials would have an economic disadvantage, however, when compared to other vegetable oil components which are readily available and relatively inexpensive.

Another group of compounds which are included in the classification of vegetable oils in this invention are the glycerides of unsaturated hydroxy fatty acids having from eight to eighteen carbon atoms, at least one double bond and at least one hydroxyl group. A preferred triglyceride of an unsaturated hydroxy fatty acid is castor oil which consists principally of triglycerides of ricinoleic acid (an 18 carbon acid having a double bond in the 9-10 position and a hydroxyl group on the 12th carbon). Also, the triglycerides of this class may also contain other functional groups or nonreactive components.

A second class of compounds which can be used in place of or along with the above-described vegetable oils includes unsaturated fatty carbon compounds having at least one hydroxyl group. This group would include monoesters and diesters of fatty acids having at least eight carbon atoms and at least one double bond. Specific examples include ethylene glycol monoricinoleate, butane diol diricinoleates, fatty alcohols having eight or more carbon atoms, or polyhydric alcohols having at least one double bond. This group would also include the dimer or trimer fatty acid diols.

The liquid cyclopentadienyl compounds which are suitable in the preparation of the graft polyols of the present invention include cyclopentadiene, methyl cyclopentadiene, dicyclopentadiene, methyl cyclopentadiene dimer, their mixtures and their low molecular weight polymers and copolymers, such as trimers, tetramers, pentamers, etc. At the graft polymerization temperatures used in the process of preparing the polyols of the present invention, the dimers, trimers, tetramers and the low molecular weight polymers and copolymers of cyclopentadiene and methyl cyclopentadiene depolymerize first and then copolymerize to form the desired polyols.

Suitable terminally unsaturated hydroxyl monomers include those compounds which terminate with the structural formula

or

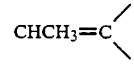

Specifically, compounds such as allyl alcohol and the acrylic, methacrylic and crotonic acid mono-esters of ethylene glycol, propylene glycol, 1-4 butanediol, 1-6 hexanediol, 2,2 dimethyl -1,3-propanediol, 1-4 cyclohexane dimethanol, diethylene glycol, triethylene glycol, dipropylene glycol, and tripropylene glycol are preferred.

When unsaturated, non-hydroxy, fatty acid triglycerides are used, the amount of terminally unsaturated hydroxyl monomer should be increased proportionally. Again, however, since these monomers are generally much more expensive than the triglycerides, this creates an economic disadvantage.

In a preferred embodiment of the invention, these graft polyols are comprised of castor oil, dicyclopentadiene, and hydroxyethyl methacrylate. Similar advantageous results are achieved when hydroxyethyl methacrylate is substituted with hydroxyethyl acrylate or allyl alcohol.

The amount of each component is not critical to the preparation of the graft polyols of the invention provided that a sufficient amount of each component is present. Since the economics favor the vegetable oil, it usually constitutes the primary component, and ranges from about 40 to 90 weight percent of the overall graft polyol composition. The cyclopentadienyl compound can range from about 5 to 55 weight percent, and the terminally unsaturated hydroxyl monomer content can range from about 1 to 25 weight percent. The examples further disclose certain compositions which produce particularly advantageous graft polyols.

The terminally unsaturated hydroxyl monomer has two functions: it increases the hydroxy functionality and controls the molecular weight and viscosity of the final product. It was found that without these momomers, it is difficult to produce a final polyol product having the desired viscosity and molecular weight.

Certain graft polyol products of the present invention, particularly those based on castor oil, have drying properties and may be cured to hard films in the presence of drying catalysts such as lead, cobalt, or calcium napthanates and the like, either at room temperature or by baking at 100°-150° C.

Urethane compositions having enhanced mechanical properties and solvent resistance can be obtained when any polyols produced according to the invention are cured by reaction with an isocyanate or polyisocyanate compound and by polymerization induced by drying catalysts at room temperature or by baking at 100°-150° C.

The high molecular weight, high viscosity polyols have a high degree of tack and can be used to impart tack and strength to adhesives and aid to increase the hard resin loading of the same.

In order to prepare the novel polyols of the present invention, the components are charged into an autoclave or other pressure reactor. This mixture is then preheated to about 50°-150° C., preferably under nitrogen sparging and/or agitation. After nitrogen sparging is completed, the pressure reactor is closed, and the temperature is raised to about 250°–275° C. The reaction is then allowed to proceed for a sufficient time period (normally between about 3 to 5 hours) at the autogenic reaction pressure. At the end of this period the pressure vessel is vented to remove any unreacted monomer and cooled to about room temperature.

Another, and in some cases the preferred method, is that of pre-heating the vegetable oil or fatty alcohol in the pressure reactor at the polymerization temperature, before injecting the other components. The addition of these other components in this case can be done continuously or by aliquots of each component separately or mixed together. In each case, the temperature of the reactants should not be allowed to drop below about 250° C. After preheating the vegetable oil or fatty alcohol, it may be desirable to use nitrogen sparging and/or agitation to remove air from the system before adding the other components.

The preferred polymerization temperature is about 265°±5° C. Lower temperatures generally yield products which are cloudy or even wax-like. Higher temperatures yield products which are darker in color, particularly if nitrogen sparging of the reactor is omitted. These products, however, may be suitable for certain applications.

The graft polyols of the present invention, either taken alone or in mixtures with other graft or conventional polyols, can be used to formulate high solids urethane and melamine resin compositions which are useful as maintenance, industrial, marine, machinery and appliance coatings. Additionally, applicants' graft polyols may be esterified with a polybasic acid to form an alkyd resin, which may then be modified by the addition of one or more fatty acid compounds to produce useful coatings having a good initial gloss, improved adhesion and exterior durability. The graft polyols can also be used either alone or in combination with other solventless polyols to produce polyurethane compositions which are useful in potting, molding and encapsulation applications, and as reactive tack resins, grommets, tires, belts and a variety of other commercial articles.

When the graft polyols of the present invention are cured with isocyanate compounds to form applicants' improved coating compositions, it has been determined that the relative ratio of the isocyanate moiety (i.e., N=C—0) to the hydroxyl (i.e., OH) function may range from about 0.9–1.8 to 1 and preferably from about 1.05 to 1. The isocyanate compounds which can be used for reaction with the polyol to form the polyurethane coating include aliphatic polyisocyanates, cycloaliphatic polyisocyanates or aromatic polyisocyanates. Typical of such polyisocyanate compounds are 3-isocyanatomethyl-3,5,5-trimethyl-cyclohexyl isocyanate (IPDI), toluene diisocyanate (TDI), 4,4'-diphenylmethanediisocyanate (MDI), polymethylene polyphenylisocyanate, 1,5-naphthalene diisocyanate, phenylene diisocyanates, 4,4'-methylene bis-(cyclohexylisocyanate), hexamethylene diisocyanate, biuret of hexamethylene diisocyanate, 2,2,4-trimethylhexamethylene diisocyanate and combinations thereof, as well as related aromatic, aliphatic, and cycloaliphatic polyisocyanates which may be substituted with other organic or inorganic groups that do not adversely affect the course of the reaction.

In alternate applications, i.e., where the isocyanate composition is replaced by a melamine curing agent such as, for example, hexamethoxymethylmelamine (i.e. Cymel 303) as disclosed in Example 18, the melamine composition represents, after the coating is baked to facilitate the cure, roughly ⅓ of the coating composition on a dry binder basis. The remainder of this material is comprised of ⅓ of the polyol and ⅓ of the acrylic polymer. The proportions set forth in Example 18 should not be construed as limiting, however, since the ratio of each component can range between about 25 and 75 weight percent of the composition or may be further altered within stoichiometric limits to produce coatings useful for a number of proposed applications.

With regard to the formation of alkyd resin coating compositions utilizing the polyols of the invention, it has been discovered that esterification of these polyols with a polybasic acid composition such as, for example, phthalic, maleic, fumaric or sebacic acids, or a mixture thereof, and optionally, modified by the presence of a monobasic fatty acid material, derived from soya oil, safflower oil, dehydrated castor oil, linseed oil, coconut oil and castor oil, provides improved resin compositions over those disclosed in the prior art. The relative ratio of the acid groups to hydroxyl groups from the polyhydric polyol may range from about 1 to 2 up to about 2 to 1. The preferred ratio of these functional moieties is 1:1, however, but any relative amounts of these materials may be utilized depending upon the intended application of the coating or adhesive desired.

It is also possible to form alkyd resins by well known prior art techniques including mixing the graft polyol of the invention with a second polyol, adding other components as required, and heating the overall mixture in a kettle to form the resin.

For curing these resins, well known drying agents such as one or more metallic soaps, which are well known in the art, can be added to form a coating composition that will air dry. A discussion of suitable metallic soaps can be found in the Encyclopedia of Polymer Science and Technology, Vol. 5, (1966) pp. 126–139.

It is also possible to formulate semi-drying or non-air drying alkyd coatings by limiting or eliminating the amount of unsaturation in the reactive components. By this process, the use of drying agents is unnecessary. One skilled in the art can best decide the optimum formulation for the particular use.

The examples of this application disclose the reactants and their compositions along with the temperatures and reaction times which are advantageous for graft polyols prepared from specific components or reactants. For other reactants, these variables may be slightly different, but are easily ascertainable by those skilled in the art by routine experimentation.

EXAMPLES

The scope of the invention is further described in connection with the following examples which are set forth for purposes of illustration only and are not to be construed as limiting the scope of the invention in any manner.

EXAMPLE 1

A one liter pressure reactor was charged with 450 grams of castor oil. The oil was heated to 150° C. with stirring and nitrogen sparging and held for 30 minutes. At the end of this period, 157.5 grams of dicyclopentadiene and 67.5 grams of hydroxyethyl methacrylate were charged into the reactor. The composition of the charged materials was: 66.67% by weight of castor oil, 23.33% of dicyclopentadiene and 10% of hydroxy ethyl methacrylate. The nitrogen sparging was discontinued. The reactor was closed and the temperature raised to 265° C. The pressure in the reactor reached a maximum of 80 psi at 240° C. At this temperature the monocyclopentadiene generated by the cracking of the dicyclopentadiene started to copolymerize with the hydroxyethyl methacrylate and the castor oil and the pressure in the reactor started to decrease even though the temperature was increasing. After a 3 hour reaction at 265° C., the pressure decreased to 24 psi and then remained constant, while the reaction was continued for an additional hour. The reactor was vented for a few minutes, closed, and then cooled to about 200° C. A vacuum of 50 mm. was applied for 30 minutes to distill the unreacted monomers. A 2.5 gram sample of an amber colored liquid was collected in the vacuum trap, and it indicated a product yield of 99.6%. The vacuum was discontinued. The product cooled to about room temperature and discharged from the reactor. The product was a clear, liquid having a viscosity of 10,800 cps at 25° C., an acid value of 3, an OH value of 140.4, and an iodine value of 119.3.

EXAMPLE 2

Using the same procedure as described in Example 1, 300 grams of castor oil was reacted with 87 grams of dicyclopentadiene and 63 grams of hydroxyethyl methacrylate. The composition of the charged material in this case was: 66.67% of castor oil, 19.33% of dicyclopentadiene and 14% of the hydroxyethyl methacrylate. The reaction product was a liquid containing some suspended polymer particles. These particles, however, were easily removed by filtering the product through a 100 mesh screen. The clear, filtered product had a viscosity of 9,260 cps at 25° C., an acid value of 1.7, an OH value of 154.7 and an iodine value of 116.3.

EXAMPLE 3

Using the procedure as described in Example 1, 300 grams of castor oil was reacted with 93 grams dicyclopentadiene and 57 grams of hydroxyethyl acrylate. The composition of the charged materials was: 66.67% of castor oil, 20.66% of dicyclopentadiene, and 12.67% of hydroxyethyl acrylate. The reaction product was a liquid containing, in suspension, some polymer particles. After filtration through a 100 mesh screen, the clear, final product had a viscosity of 4,560 cps at 25° C., an acid value of 1.4, an OH value of 155, and an iodine value of 109.6.

EXAMPLE 4

Using the procedure as described in Example 1, 300 grams of castor oil was reacted with 121.5 grams of dicyclopentadiene and 28.5 grams of allyl alcohol. The composition of the charged materials was: 66.67% of castor oil, 27% of dicyclopentadiene and 6.33% of allyl alcohol. In this case, because of the low boiling point of the allyl alcohol, the dicyclopentadiene and the allyl alcohol were added into the reactor at a temperature of 80° C. The product of the reaction was a clear liquid which did not require any filtration. The product had a viscosity of 8,280 cps at 25° C., an acid value of 1.9, an OH value of 150, and an iodine value of 150. The ratio of castor oil to dicyclopentadiene and hydroxy monomer in Examples 1–4 was kept constant at 2:1. The ratio of dicyclopentadiene to hydroxy monomer was calculated so that the final products would have essentially the same OH value and equivalent weight.

EXAMPLE 5

To illustrate the usefulness of the hydroxy monomers in controlling and reducing the viscosity of the final products, 300 grams of castor oil was reacted with 150 grams of dicyclopentadiene according to the procedure described in the Example 1.

The product in this case was a clear liquid having a viscosity of 291,200 cps, an acid value of 1.8, an OH value of 101, and an iodine value of 142. This product was too viscous to be considered as a useful material for the high solid coatings, however, it had very good tackifying and air drying properties.

EXAMPLE 6

To illustrate the usefulness of the dicyclopentadiene in the grafting reaction of vinyl monomers onto the castor oil, 300 grams of castor oil were reacted with 63 grams of hydroxyethyl methacrylate according to the procedure described in Example 1. The final product was a mixture of liquid and solid materials. The liquid material was unmodified castor oil containing some polymer particles in suspension. The solid material which formed or precipitated on the reactor walls, stirrer, and thermometer well was poly hydroxyethyl methacrylate.

EXAMPLE 7

To illustrate the effect of the reaction temperature on the final product, the reaction of Example 1 was repeated, except that the reaction temperature was 230° C. instead of 265° C. The product was a very cloudy liquid which could not be filtered. It had a viscosity of 2,800 cps at 25° C., an acid value of 1.1, an OH value of 152.4, and an iodine value of 112.1.

EXAMPLE 8

The reaction in Example 1 was repeated except that in this case, the temperature was 240° C. The product was cloudy and could not be filtered. It had a viscosity of 5,300 cps at 25° C., an acid value of 1.1, an OH value of 151.1, and an iodine value of 106.7.

EXAMPLE 9

The reaction of Example 1 was repeated except that, in this case, the temperature was 250° C. Again the product was slightly cloudy and was difficult to filter. It had a viscosity of 3,700 cps at 25° C., an acid value of 1.1, an OH value of 148.1, and an iodine value of 109.5.

Examples 7–9 support the disclosure that a reaction temperature range of 250°–275° C. (preferably 265° C. as in Example 1) must be used in order to prepare a clear product which does not need any filtration.

EXAMPLE 10

Using the same procedure as described in Example 1, 450 grams of castor oil was reacted with 174 grams of dicyclopentadiene and 51 grams of allyl alcohol. The dicyclopentadiene and the allyl alcohol were added to the castor oil in the reactor at a temperature of 75° C. The composition of the reactant materials was: 66.67% of castor oil, 25.78% of dicyclopentadiene, and 7.55% of allyl alcohol. The product was a clear liquid which did not require any filtration. It had a viscosity of 4,600 cps at 25° C., an acid value of 2.2, an OH value of 168.6, and an iodine value of 121.1.

EXAMPLE 11

Using the same procedure as described in Example 1, 335 grams of castor oil were reacted with 259 grams of dicyclopentadiene and 76 grams of allyl alcohol. The dicyclopentadiene and the allyl alcohol were added to the castor oil at a temperature of 75° C. The composition of the reactant materials was 50% of castor oil, 38.67% of dicyclopentadiene, and 11.33% of allyl alcohol. The product was a clear material and did not require any filtration. It had a viscosity of 32,500 cps at 25° C., an acid value of 2.0, an OH value of 172.7, and an iodine value of 138.2.

EXAMPLE 12

Using the same procedure as described in Example 1, 335 grams of castor oil was reacted with 232.2 grams of dicyclopentadiene, and 102.2 grams of allyl alcohol. The dicyclopentadiene and the allyl alcohol were added to the castor oil at a temperature of 75° C. The composition of the reactants was: 50% of castor oil, 34.75% of dicyclopentadiene, and 15.25% of allyl alcohol. The product was a clear liquid which did not require any filtration. It had a viscosity of 9,040 at 25° C., an acid value of 2.2, an OH value of 203, and an iodine value of 128.5.

EXAMPLE 13

A one liter pressure reactor was charged with 520 grams of the castor oil. The oil was heated to 265° C. with stirring and nitrogen sparging and held for 15 minutes at that temperature. At the end of this period the nitrogen sparging was discontinued and the reactor closed. A mixture containing 176 grams of the dicyclopentadiene and 104 grams of the hydroxyethyl acrylate was prepared. The composition of the reactants was: 65% of castor oil, 22% of dicyclopentadiene, and 13% of hydroxyethyl acrylate. A 93.3 gram aliquot of this mixture was pumped into the reactor. The temperature dropped initially to 250° C. and then again started to increase. When the temperature reached 265° C., a second aliquot of 93.3 grams of the dicyclopentadiene/hydroxyethyl acrylate mixture was pumped into the reactor. Again the temperature dropped to about 250° C. and then started to increase. When the temperature reached 265° C., the remaining 93.4 grams of the dicyclopentadiene hydroxyethyl acrylate mixture was added. The temperature was raised to 265° C. and kept constant for 4 hours. At the end of this period the reactor was vented for a few minutes, closed, and then cooled to about 200° C. A vacuum of about 50 mm was applied for 30 minutes to distill the unreacted monomers. The vacuum was discontinued and the product cooled to room temperature. The product was a clear liquid and did not require filtration. It had a viscosity of 5,620 cps at 24° C., an acid value of 3.6, an OH value of 153.6, and an iodine value of 109.8.

EXAMPLE 14

The experiment as described in Example 13 was repeated. Again the product was a clear liquid and did not need to be filtered. It had a viscosity of 5,910 at 26° C., an acid value of 3.3, an OH value of 149.9, and an iodine value of 113.9.

EXAMPLE 15

A one liter pressure reactor was charged with 357 grams of soybean oil, 238 grams of dicyclopentadiene and 105 grams of allyl alcohol. The mixture was heated to 265° C. and was held at this temperature for approximately 4 hours. The reactor was vented and allowed to cool to room temperature. The resulting material was a clear liquid having a viscosity of 2,010 cps at 23° C., an acid value of 1.4, an OH value of 140.5, and an iodine value of 143.2.

EXAMPLE 16

The experiment described in Example 15 was repeated, except that 357 grams of cottonseed oil was used instead of soybean oil. Again, the product was a clear liquid which did not require filtration. It had a viscosity of 1940 cps at 21° C., an acid value of 1.0, and OH value of 131.6 and an iodine value of 142.5.

EXAMPLE 17

The reactor of Example 14 was charged this time with a fatty alcohol, Emery 2873, having an OH value of 97, an equivalent weight of 578.4, and an iodine value of 97.7, in an amount of 455 grams (65% of the mixture). To the Emery 2873 was added 182 grams (26%) of dicyclopentadiene and 63 grams of allyl alcohol. The mixture was heated to 265° C. for four hours then cooled to room temperature. Again the product was a clear liquid having a viscosity of 1,300 cps at 21° C., an acid value of 0.67, an iodine value of 129.1 and an OH value of 140.6.

The polyols of this invention were then mixed with a polymeric MDI polyisocyanate having an equivalent weight of 133 and cured in the form of sheets for 24 hours at room temperature, followed by 24 hours at 60° C. The ratio NCO/OH was 1.05. The mechanical properties of the cured polyurethanes were then determined. The results are summarized in the following Table I.

TABLE I

| MECHANICAL PROPERTIES OF POLYURETHANES | | | |
|---|---|---|---|
| Polyol of Example | "A" Hardness | Tensile Strength psi | % Elongation |
| 1 | 92 | 2500 | 110 |
| 2 | 90 | 3755 | 66 |
| 3 | 90 | 2169 | 123 |
| 4 | 92 | 1702 | 138 |
| 10 | 90 | 1693 | 140 |
| 13 | 94 | 2000 | 136 |
| 14 | 90 | 2015 | 132 |
| Castor Oil (control) | 72 | 815 | 103 |

Samples of the cured polyurethane compositions were kept immersed for one week in the following solutions: a 10% solution of $K_2CO_3$ at 100° C., 10% $H_2SO_4$ at 100° C., ethanol at the refluxing temperature of 80° C., and mineral spirits at 100° C.

The results showed that polyurethane compositions containing the polyols of this invention had considerably improved resistance to these solvents as compared to the polyurethane composition containing the unmodified castor oil.

To show that mixtures of present polyols can provide high performance polyurethane compositions, the following tests were conducted. Equal amounts of the graft polyols of Examples 15 and 3, Examples 16 and 3 and Examples 17 and 3 were mixed to provide three combination polyols. These polyols were then cured with a polymeric MDI polyisocanate as described above. The resulting properties of the cured polyurethanes were determined and summarized in Table II, as shown below.

TABLE II

MECHANICAL PROPERTIES OF POLYURETHANES

| Combination Polyol | Hardness | Tensile Strength psi | Percent Elongation |
|---|---|---|---|
| 3,15 | 95 | 501 | 130 |
| 3,16 | 95 | 420 | 83 |
| 3,17 | 95 | 960 | 120 |

EXAMPLE 18

A control formulation of 250 grams of K-Flex 188, a 500 molecular weight dihydoxy functional aliphatic polyester available from King Industries, 550 grams of titanium oxide ($TiO_2$), sold under the trade name Tronox CR-800, 117.5 grams of n-butanol, 125 grams of 2-ethoxyethylacetate, 333 grams of a polyhydroxy functional acrylic oligomer in methyl amyl ketone sold under the trade name K-Cryl 200-6/MAK by King Industries, Inc., 250 grams of hexamethoxymethylmelamine, sold under the trade name Cymel 303, a melamine-formaldehyde resin having a specific gravity of 1.2, a degree of polymerization of 1.7 and 0.5% maximum free formaldehyde 69.5 grams of n-butyl acetate and 14.7 grams of an amine blocked p-toluene sulfonic acid sold by King Industries, Inc., were mixed in order to form a coating composition. The coating was subsequently baked at 250° F. (i.e., 121.1° C.) for one-half hour and was then found to be comprised of 33% of the acrylic and 33% of the polyol along with 33% of the melamine ingredient.

In a second formulation, the K-Flex 188 was replaced by 250 grams of the graft polyol of Example 3.

Tests were performed on the resulting coatings and the following results were obtained. The Pencil Hardness for each coating after one hour was determined to be H, although at twenty-four hours after the coating was baked, the K-Flex 188 coating exhibited a hardness of 4H compared to H for the graft polyol coating. This increased hardness was offset by relatively poor reverse impact properties for the K-Flex 188 coating. Specifically, the reverse impact resistance of the K-Flex 188 coating material was 8 inch-pounds while the graft polyol coating measured 25-inch pounds, thus showing the greater flexibility and adhesion for the graft polyol coating. The flexibility of the graft polyol coating was determined to be 34.4% compared to only 5.7% for the K-Flex 188 coating. In addition, the 60° gloss test values, the methylethylketone double rub test values were determined to be comparable. The VOC measurement, in pounds per gallon, was also comparable. These values clearly demonstrate the improvement in physical properties of the melamine cured graft polyol composition over the standard polyester polyols of the prior art.

EXAMPLE 19

(Comparative) 100% Acrylic polyol Based maintenance coating at 4.39 voc for application via suction type spray equipment.

| Ingredients | Parts by Weight |
|---|---|
| Component A: | |
| acrylic polyol (QR-946 by Rohm & Haas) | 289.14 |
| thixotrope (Bentone 27 by NL Industries) | 8.09 |
| solvent blend (see below) | 329.65 |
| $TiO_2$ pigment (Tipure R-960 by Dupont) | 201.01 |
| U.V. absorber (Tinuvin 328 by Ciba-Geigy) | 2.83 |
| hindered amine light stabilizer | |
| (Tinuvin 292 by Ciba-Geigy) | 4.40 |
| antioxidant (Irganox B225 by Ciba-Geigy) | 0.70 |
| catalyst (T-12 50% in solution by Air Products) | 0.09 |
| flow additive (Tego 460 by Goldschmidt) | 1.41 |
| mar and slip additive (Byk 320 by Byk-Chemie) | 3.46 |
| defoamer (Byk 070 by Byk-Chemie) | 3.46 |
| Component B: | |
| isocyanate (Desmodur N3390 by Mobay Chemical | 103.33 |
| | 947.57 |

NCO/OH = 1.05/1
Pigment/Binder = .7/1
Tinuvin 328 = 1% on binder solids
Tinuvin 292 = 1.5% on binder solids
Irganox B225 = 0.25% on binder solids
T-12 = .014% on binder solids
Solids by weight = 53.64%
Solids by volume = 36.99%
VOC = 4.39 pounds per gallon
Dry film thickness = 1.5 to 2 mils
Application by pressure pot or suction gun spray
Air Dry
Solvent Blend = mixture of Exxate 600 (by Exxon), xylene and methyl ethyl ketone at a ratio of 5:50:45
Viscosity = 23 seconds, ZAHN #2 cup

EXAMPLES 20-22

The following examples are of acrylic polyol maintenance coatings which are modified by utilizing the graft polyol of Example 3 of the invention.

Table III compares the properties of the coating of Example 19 with one where 30% of the acrylic polyol is substituted with the graft polyol of Example 3.

EXAMPLE 20

Modified maintenance coating at 3.20 voc

| Ingredients | Parts by Weight |
|---|---|
| Component A: | |
| Polyol of Example 3 | 80.87 |
| QR-946 | 281.39 |
| Bentone 27 | 12.29 |
| Solvent Blend (see below) | 206.88 |
| Tipure R-960 | 282.80 |
| Tinuvin 328 | 4.02 |
| Tinuvin 292 | 6.15 |
| Irganox B225 | 1.02 |
| T-12 (50%) | 0.12 |
| Tego 460 | 1.90 |
| Byk 320 | 4.73 |
| Byk 070 | 4.73 |
| Component B: | |
| Desmodur N3390 | 149.55 |
| | 1,036.45 |

NCO/OH = 1.05/1
Pigment/Binder = .7/1
Tinuvin 328 = 1% on binder solids
Tinuvin 292 = 1.5% on binder solids
Irganox B225 = 0.25% on binder solids
T-12 = .014% on binder solids
Solids by weight = 69.12%
Solids by volume = 53.39%
VOC = 3.20 pounds per gallon
Dry film thickness = 1.5 to 2 mils
Application by pressure pot or airless equipment
Air Dry
Solvent Blend = 95% methyl N—amyl ketone and 5% Ektasolve PM Acetate (by Eastman Kodak)
Viscosity = 27 seconds, ZAHN #3 Cup

EXAMPLE 21

Modified maintenance coating at 3.49 voc

| Ingredients | Parts by Weight |
|---|---|
| Component A: | |
| Polyol of Example 3 | 74.49 |
| QR-946 | 259.19 |
| Bentone 27 | 11.32 |
| Solvent Blend (see below) | 244.68 |
| Tipure R-960 | 260.49 |
| Tinuvin 328 | 3.70 |
| Tinuvin 292 | 5.66 |
| Irganox B225 | 0.94 |
| T-12 (50%) | 0.11 |
| Tego 460 | 1.75 |
| Byk 320 | 4.35 |
| Byk 070 | 4.35 |
| Component B: | |
| Desmodur N3390 | 137.75 |
| | 1,008.78 |

NCO/OH = 1.05/1
Pigment/Binder = .7/1
Tinuvin 328 = 1% on binder solids
Tinuvin 292 = 1.5% on binder solids
Irganox B225 = 0.25% on binder solids
T-12 = .014% on binder solids
Solids by weight = 65.41%
Solids by volume = 49.18%
VOC = 3.49 pounds per gallon
Dry film thickness = 1.5 to 2 mils
Application by airless or pressure pot equipment
Air Dry
Solvent Blend = 95% methyl N—Amyl ketone and 5% Ektasolve PM Acetate
Viscosity = 14 seconds, ZAHN #3 cup

EXAMPLE 22

Modified maintenance coating at 3.50 voc

| Ingredients | Parts by Weight |
|---|---|
| Component A: | |
| Polyol of Example 3 | 75.46 |
| QR-946 | 262.59 |
| Bentone 27 | 11.47 |
| Solvent Blend (see below) | 244.46 |
| Tipure R-960 | 263.90 |
| Tinuvin 328 | 3.75 |
| Tinuvin 292 | 5.73 |
| Irganox B225 | 0.96 |
| T-12 (50%) | 0.11 |
| Tego 460 | 1.77 |
| Byk 320 | 4.41 |
| Byk 070 | 4.41 |
| Component B: | |
| Desmodur N3390 | 139.56 |
| | 1018.58 |

NCO/OH = 1.05/1
Pigment/Binder = .7/1
Tinuvin 328 = 1% on binder solids
Tinuvin 292 = 1.5% on binder solids
Irganox B225 = 0.25% on binder solids
T-12 = .014% on binder solids
Solids by weight = 65.63%
Solids by volume = 49.83%
VOC = 3.50 pounds per gallon
Dry film thickness = 1.5 to 2 mils
Application by pressure pot
Air Dry
Solvent Blend = mixture of Exxate 600, xylene and methyl ethyl ketone at a ratio of 10:42.5:47.5
Viscosity = 15 seconds, ZAHN #3 cup

TABLE III

PERFORMANCE PROPERTIES OF AN ACRYLIC POLYOL BASED PAINT SYSTEM ALONE AND MODIFIED WITH THE GRAFT POLYOL OF EXAMPLE 3

| Property | 100% QR-946 | 70% QR-946 30% Graft Polyol of Example 3 |
|---|---|---|
| VOC at 23 secs. ZAHN #2 (Lbs/Gal): | 4.39 | 3.50 |
| 1000 hours QUV Gloss Retention (Delta 60 degree gloss): | −1.8 | −1.9 |
| 1000 hours QUV color stability (Delta E): | 0.9 | 0.6 |
| 500 hour QUV blistering: | none | none |
| 1000 hour salt Fog chamber Resistance to Edge creep on unprimed panels: | less than .0625 inches | less than 0.625 inches |

EXAMPLE 23

(COMPARATIVE) 100% Acrylic polyol based maintenance coating at 5.08 voc

| Ingredients | Parts by Weight |
|---|---|
| Component A: | |
| acrylic polyol (AU-608X by Rohm & Haas) | 254.74 |
| Tipure R-960 | 138.68 |
| Tinuvin 328 | 2.01 |
| Tinuvin 292 | 2.98 |
| Irganox B225 | 0.51 |
| T-12 (50%) | 0.05 |
| Bentone 27 | 6.94 |
| Solvent Blend (see below) | 392.85 |
| Tego 460 | 1.08 |
| Byk 320 | 2.67 |
| Byk 070 | 2.67 |
| Component B: | |
| Desmodur N3390 | 56.00 |
| | 861.18 |

NCO/OH = 1.05/1
Tinuvin 328 = 1% on binder solids
Tinuvin 292 = 1.5% on binder solids
Irganox B225 = 0.25% on binder solids
T-12 = 0.014% on binder solids
% Solids by weight = 40.96
% Solids by volume = 26.56
VOC = 5.08 lbs/gal
Dry film thickness = 1.5 to 2 mils
Application by pressure pot equipment
Air Dry
Solvent Blend = mixture of Exxate 600, xylene and methyl ethyl ketone at a ratio of 4.8:8.4:86.8
Viscosity = 23 seconds, ZAHN #2 cup

EXAMPLE 24

Modified maintenance coating at 4.48 voc

The acrylic polyol composition of Example 23 which is modified with the graft polyol of Example 3 of the invention.

Table IV provides a further comparison of the coating composition of Example 23 with one where 30% of the acrylic polyol is substituted with the graft polyol of Example 3.

| Ingredients | Parts by Weight |
| --- | --- |
| Component A: | |
| graft polyol of Example 3 | 56.09 |
| AU-608X | 225.67 |
| Tipure R-960 | 183.43 |
| Tinuvin 328 | 2.62 |
| Tinuvin 292 | 3.93 |
| Irganox B225 | 0.66 |
| T-12 (50%) | 0.08 |
| Bentone 27 | 8.37 |
| Solvent Blend (see below) | 341.14 |
| Tego 460 | 1.28 |
| Byk 320 | 3.21 |
| Byk 070 | 3.21 |
| Component B: | |
| Desmodur N3390 | 83.41 |
| | 913.10 |

NCO/OH = 1.05/1
Tinuvin 328 = 1% on binder solids
Tinuvin 292 = 1.5% on binder solids
Irganox B225 = 0.25% on binder solids
T-12 = 0.014% on binder solids
% Solids by weight = 50.95
% Solids by volume = 35.51
VOC = 4.48 lbs/gal
Dry film thickness = 1.5 to 2 mils
Application by pressure pot equipment
Air Dry
Solvent Blend = mixture of Exxate 600, xylene and methyl ethyl ketone at a ratio of 4.9:11.8:83.3
Viscosity = 23 seconds, ZAHN #2 cup

TABLE IV

PERFORMANCE PROPERTIES OF AN ACRYLIC POLYOL BASED PAINT SYSTEM ALONE AND MODIFIED WITH THE GRAFT POLYOL OF EXAMPLE 3

| Polyol Solids | 100% AU-608X | 30% Graft Polyol of Example 3 70% AU-608X |
| --- | --- | --- |
| VOC at 23 secs. ZAHN #2 (Lbs/Gal): | 5.08 | 4.48 |
| Surface Appearance | rippled | smooth |
| Initial 60 Degree Gloss (% Reflectance): | 92.4 | 94.2 |
| Gloss Retention 500 hours QUV (Delta Gloss): | −3.6 | −1.7 |

These results also show that the cured compositions containing the combination polyols of the invention can be formulated to provide a variety of coatings having desirable properties.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new and desire to secure by Letters Patent is:

1. A coating composition comprising: a polyol component comprising the liquid reaction product of:
   (a) at least one unsaturated fatty carbon compound having at least 8 carbon atoms, at least one hydroxyl group, and at least one ethylenic double bond, said compound having other than terminal unsaturation;
   (b) at least one liquid cyclopentadienyl compound; and
   (c) at least one terminally unsaturated monomer or compound having at least one hydroxyl group; and a curing agent comprising an isocyanate compound or an aminoplast resin.

2. The composition of claim 1 wherein the unsaturated fatty carbon compound is castor oil.

3. The composition of claim 1 wherein the terminally unsaturated hydroxyl monomer is a monoester of acrylic or methacrylic acid and a diol.

4. The composition of claim 1 wherein the terminally unsaturated hydroxyl monomer is allyl alcohol, or an acrylic, methacrylic or crotonic acid mono-ester of ethylene glycol, propylene glycol, 1-4 butanediol, 1-6 hexanediol, 2,2 dimethyl -1,3- propanediol, 1-4 cyclohexane dimethanol, diethylene glycol, triethylene glycol, dipropylene glycol, or tripropylene glycol.

5. The composition of claim 1 wherein the terminally unsaturated hydroxyl monomer is allyl alcohol, hydroxyethyl acrylate or hydroxyethyl methacrylate.

6. The composition of claim 1 wherein the cyclopentadienyl compound is cyclopentadiene, methyl cyclopentadiene, dicyclopentadiene, methyl cyclopentadiene dimer, and mixtures of these compounds or their low molecular weight copolymers.

7. The composition of claim 1 wherein the unsaturated fatty carbon compound is present in the polyol in an amount of about 50 to 90 weight percent, the cyclopentadienyl compound is present in the polyol in an amount of 5 to 40 weight percent, and the terminally unsaturated hydroxyl monomer is present in the polyol in an amount of about 1 to 25 weight percent.

8. The composition of claim 1 wherein the polyol has about 50 to 90 weight percent castor oil, 5 to 40 weight percent cyclopentadiene or dicyclopentadiene, and 1 to 25 weight percent of hydroxyethyl methacrylate, hydroxyethyl acrylate or allyl alcohol.

9. The composition of claim 1 wherein the polyol component further comprises between 1 and 99% by weight of a second polyol.

10. The composition of claim 1 wherein said curing agent is a melamine compound.

11. The composition of claim 10 wherein said melamine compound is hexamethoxymethylmelamine.

12. The composition of claim 10 wherein said melamine compound comprises up to about ⅓ of said coating by weight.

13. The composition of claim 1 wherein said curing agent is an isocyanate compound.

14. The composition of claim 13 wherein said isocyanate compound is an aliphatic, cycloaliphatic or aromatic polyisocyanate or a prepolymer or adduct thereof.

15. The composition of claim 13 wherein the isocyanate and polyol are present in amounts such that the NCO:OH ratio is between 0.9 and 1.8 to 1.

16. A coating composition comprising:
   (a) at least one unsaturated fatty carbon compound having at least 8 carbon atoms, at least one hydroxyl group, and at least one ethylenic double bond, said compound having other than terminal unsaturation;
   (b) at least one liquid cyclopentadienyl compound; and
   (c) at least one terminally unsaturated monomer or compound having at least one hydroxyl group; and a curing agent comprising a drying catalyst or an unsaturated acid in an amount sufficient to cause the composition to polymerize in the presence of air or oxygen.

17. The composition of claim 16 wherein an organic acid selected from the group consisting of phthalic, fumaric, maleic and sebacic acids is added to the composition prior to its polymerization.

18. The composition of claim 16 wherein the relative ratio of acid groups to hydroxyl groups within said composition ranges from about 1:2 to 2:1.

19. The composition of claim 16 wherein the drying catalyst is a metallic soap which enables the composition to air dry more rapidly throughout the composition.

20. A process for preparing a coating composition which comprises:
preparing a polyol component by:
(a) placing (i) at least one unsaturated fatty carbon compound having at least eight carbon atoms, at least one hydroxyl group, and at least one ethylenic double bond, said compound having other than terminal unsaturation, (ii) at least one cyclopentadienyl compound, and (iii) at least one terminally unsaturated hydroxyl monomer in a pressurized reactor to form a mixture; and
(b) heating said mixture at a temperature between about 250°–275° C. for a sufficient time to form a graft polyol; and
curing said graft polyol with a curing agent comprising an isocyanate compound or an aminoplast resin to form a coating composition.

21. The process of claim 20 which further comprises removing air from the reactor before heating the mixture.

22. The process of claim 21 which further comprises preheating the mixture from 50° to 150° C. to assist in removal of air from the reactor.

23. The process of claim 22 which further comprises sparging with nitrogen with or without agitation during the preheating step to assist in the removal of air.

24. The process of claim 20 wherein the polyol component is mixed with a second polyol prior to the curing step.

25. The process of claim 20 wherein the polyol is cured by baking said composition at about 250° F. for about ½ hour.

26. A process for preparing a coating composition which comprises:
preparing a polyol component by
(a) placing (i) at least one carbon compound having at least eight carbon atoms, at least one hydroxyl group, and at least one ethylenic double bond, said compound having other than terminal unsaturation, (ii) at least one cyclopentadienyl compound, and (iii) at least one terminally unsaturated hydroxyl monomer in a pressurized reactor to form a mixture; and
(b) heating said mixture at 250°–275° C. for a sufficient time to form a graft polyol; and
curing said graft polyol by esterifying the graft polyol with an unsaturated acid in an amount sufficient to cause the resulting composition to polymerize in the presence of air or oxygen, optionally with the addition of a drying catalyst; and allowing the composition to dry to a solid film.

27. A process for preparing a coating composition which comprises:
forming a polyol component by:
(a) placing at least one unsaturated fatty carbon compound having at least eight atoms, at least one hydroxy group, and at least one ethylenic double bond, said compound having other than terminal unsaturation in a pressurized reactor;
(b) preheating the unsaturated fatty carbon compound;
(c) adding at least one liquid cyclopentadienyl compound and at least one terminally unsaturated hydroxyl monomer to the preheated unsaturated fatty carbon compound to form a mixture; and
(d) heating this mixture at a temperature between about 250°–275° C. for a sufficient time to form a graft polyol; and
adding to said composition an isocyanate compound, a polybasic acid compound or an aminoplast resin for curing the polyol to thus form a coating composition.

28. The process of claim 27 wherein the unsaturated fatty carbon compound is preheated to between about 50° and 150° C.

29. The process of claim 27 wherein the unsaturated fatty carbon compound is preheated to between about 250° and 275° C.

30. The process of claim 27 wherein at least one liquid cyclopentadienyl compound and at least one terminally unsaturated hydroxyl monomer individually or jointly is added to the unsaturated fatty carbon compound by aliquots or continuously.

31. The process of claim 27 which further comprises removing air from the reactor before heating the mixture.

32. The process of claim 30 which further comprises sparging with nitrogen with or without agitation during the preheating step to assist in the removal of air.

33. The process of claim 27 wherein the polyol component is mixed with a second polyol prior to the curing step.

34. A process for preparing a coating composition which comprises forming a polyol component by:
(a) placing castor oil in a pressurized reactor;
(b) adding cyclopentadiene or dicyclopentadiene, and allyl alcohol, hydroxy ethyl acrylate or hydroxy ethyl methacrylate to the castor oil to form a mixture; and
(c) heating said mixture at a temperature between about 260° and 275° C. for 3 to 4 hours to form a graft polyol; and
curing the polyol component by addition of an aminoplast resin thereto; by reaction with an isocyanate compound; by contact with a drying catalyst; or by esterification with an unsaturated acid to form a coating composition.

35. The process of claim 34 wherein the castor oil is preheated between about 50° to 150° C. with nitrogen sparging, and/or agitation to remove air from the reactor.

36. The process of claim 34 wherein the castor oil is preheated between about 250° to 275° C. with nitrogen sparging, and/or agitation to remove air from the reactor.

37. The process of claim 34 wherein the cyclopentadiene or dicyclopentadiene, or allyl alcohol, hydroxyethyl acrylate, or hydroxy ethyl methacrylate is added individually or jointly to the castor oil by aliquots or continuously.

38. The process of claim 34 wherein the polyol component is mixed with a second polyol prior to reaction with the curing agent.

39. The process of claim 34 wherein the polyol is cured by esterification with a polybasic acid to form an alkyd resin.

40. The process of claim 39 which further comprises adding to said polybasic acid a monobasic fatty acid prior to the esterification of said polyol so as to form a modified alkyd resin coating.

41. The coating composition produced by the process of claim 20.

42. The coating composition produced by the process of claim 24.

43. The coating composition produced by the process of claim 25.

44. The coating composition produced by the process of claim 26.

45. The coating composition produced by the process of claim 27.

46. The coating composition produced by the process of claim 34.

47. A coating composition comprising:
a polyol component comprising the liquid reaction product of:
(a) at least one vegetable oil;
(b) at least one liquid cyclopentadienyl compound; and
(c) at least one unsaturated monomer having at least one hydroxyl group; and
a curing agent comprising an isocyanate compound, an aminoplast resin, a drying catalyst or an unsaturated fatty acid.

48. The composition of claim 47 wherein the unsaturated monomer is a monoester of acrylic, methacrylic, or crotonic acid and a diol.

49. The composition of claim 48 wherein the monoester is a monoester of acrylic, methacrylic or crotonic acid and ethylene glycol, propylene glycol, 1-4 butanediol, 1-6 hexanediol, 2,2 dimethyl-1,3-propanediol, 1-4 cyclohexane dimethanol, diethylene glycol, triethylene glycol, dipropylene glycol, or tripropylene glycol.

50. The composition of claim 47 wherein the vegetable oil is chinawood oil, soybean oil, dehydrated castor oil, sunflower oil, cotton oil, safflower oil, perilla oil or a synthetic triglyceride.

51. The composition of claim 47 wherein the polyol component further comprises between 1 and 99% by weight of a second polyol.

52. A process for preparing a coating composition which comprises:
preparing a polyol component by:
(a) placing
(i) at least one vegetable oil;
(ii) at least one liquid cyclopentadienyl compound, and
(iii) at least one unsaturated monomer having at least one hydroxyl group in a pressurized reactor to form a mixture; and
(b) heating this mixture at a temperature between about 250°–275° C. for a sufficient time to form a graft polyol liquid reaction product; and
curing said graft polyol with an isocyanate compound, an aminoplast resin, a drying catalyst or an unsaturated fatty acid to form a coating composition.

53. The process of claim 52 wherein the polyol component is mixed with a second polyol prior to the curing step.

54. The process of claim 52 wherein the unsaturated monomer is a monoester of acrylic, methacrylic or crotonic acid and a diol.

55. The composition of claim 16 wherein the drying catalyst is heat or a metallic soap.

56. The composition of claim 16 which further includes a second drying catalyst.

57. The composition of claim 56 wherein the second drying catalyst is heat or a metallic soap.

58. The process of claim 26 wherein the drying catalyst is a metallic soap.

* * * * *